United States Patent [19]

Takeda et al.

[11] Patent Number: 5,041,515

[45] Date of Patent: Aug. 20, 1991

[54] METHODS FOR PREPARING POLYTITANOCARBOSILAZANE POLYMERS AND CERAMICS THEREFROM

[75] Inventors: Yoshihumi Takeda, Jouetsu; Minoru Takamizawa, Tokyo; Akira Hayashida, Higashimurayama, all of Japan

[73] Assignee: Shin-Etsu Chemical Co., Ltd., Tokyo, Japan

[21] Appl. No.: 571,132

[22] Filed: Aug. 2, 1990

[30] Foreign Application Priority Data

Aug. 24, 1989 [JP]  Japan .................................. 1-216093

[51] Int. Cl.$^5$ ............................................. C08G 77/04
[52] U.S. Cl. ...................................... 528/34; 528/395
[58] Field of Search .................................. 528/34, 395

[56] References Cited

U.S. PATENT DOCUMENTS

| 3,853,567 | 12/1974 | Verbeek | 106/44 |
| 4,097,294 | 6/1978 | Rice et al. | 106/43 |
| 4,312,970 | 1/1982 | Gaul, Jr. | 526/271 |
| 4,359,559 | 11/1982 | Yajima et al. | 528/35 |
| 4,395,460 | 7/1983 | Gaul | 428/408 |
| 4,404,153 | 9/1983 | Gaul, Jr. | 264/29.2 |
| 4,482,669 | 11/1984 | Seyferth et al. | 524/442 |
| 4,482,689 | 11/1984 | Haluska | 528/25 |
| 4,535,007 | 8/1985 | Cannady | 427/226 |
| 4,540,803 | 9/1985 | Cannady | 556/412 |
| 4,595,775 | 6/1986 | Arkles | 556/409 |
| 4,847,345 | 7/1989 | Takamizawa et al. | 528/35 |

OTHER PUBLICATIONS

Andrianov et al., J. Organometal. Schem, 3 (1965) 129–137, "Reactions of Organocyclosilazanes w. Electrophilic and Nucleophilic Reagents".

Zhdanov et al., Pólymer Science USSR, vol. 23, No. 6, pp. 1429–1438, "Catalytic Polycondensation of Organosilazanes", (date unavailable), 1981.

Andrianov et al., M. V. Lomonosov Moscow Institute of Fine Chem. Techn., "Reaction of α,ω-Dihydromethylsilzanes with Nucleophilic Reagents", Doklady Akademii Nauk SSSR, vol. 176, No. 1, pp. 85–88, Sep. 1967.

Andrianov, M. V. Lomonosov Moscow Institute of Fine Chem. Techn., "Synthesis of Isotopically Substituted Organosilazanes and some Features of Thier IR Spectra", Zhurnal Obshcheimii, vol. 49, No. 12, pp. 2683–2689, Dec. 1979.

V. V. Kazakova et al., "Chemical Properties of Organooligocyclosilazanes and the Synthesis of Polymers on Their Basis", Polymer Science USSR, vol. 26, No. 8, pp. 1889–1897, 1984.

*Primary Examiner*—Melvyn I. Marquis
*Assistant Examiner*—M. Glass
*Attorney, Agent, or Firm*—McAulay Fisher Nissen Goldberg & Kiel

[57] ABSTRACT

Polytitanocarbosilazane polymers useful as ceramic precursors are prepared by reacting organic silicon compounds of first and second types, a titanium compound, and a disilazane. Ceramic fibers are obtained by melt spinning the polymers followed by infusibilization and pyrolysis.

5 Claims, 2 Drawing Sheets

METHODS FOR PREPARING POLYTITANOCARBOSILAZANE POLYMERS AND CERAMICS THEREFROM

This invention relates to a method for preparing polytitanocarbosilazane polymers useful as ceramic precursors and a method for preparing ceramics from the polymers.

BACKGROUND OF THE INVENTION

Great attention has been paid to ceramic materials for their heat resistance, wear resistance, high-temperature strength and other advantages. However, ceramic materials are very difficult to mechanically work since they are hard and brittle. Thus most ceramic articles are prepared by sintering and precursor methods. The sintering method involves the step of pressing or otherwise forming a ceramic material in powder form into a desired shape followed by firing. The precursor method is by melting an organic polymer as a ceramic precursor or dissolving it in a suitable solvent, forming the melt or solution into a desired shape, and then firing for converting the polymer into inorganic form. The precursor method is characterized by the potential manufacture of ceramic articles to a configuration which cannot be achieved with the powder sintering method, and especially adapted for the manufacture of fibers.

Among ceramics, SiC and $Si_3N_4$ are of great interest for high-temperature performance, more particularly because of heat resistance and high-temperature strength for the former and thermal shock resistance and fracture toughness for the latter. Extensive research works have been made on their precursors.

Most ceramic materials prepared by prior art well-known ceramic precursor methods are of Si-C-O, Si-C-N and Si-C-N-O systems although some ceramics are known to have metals such as Ti and Zr incorporated therein. A typical polymer having such a metal incorporated therein is a polytitanocarbosilane prepared by reaction of polytitanocarbosilane with titanoalkoxide as disclosed in U.S. Pat. No. 4,359,559 or Japanese Patent Application Kokai No. 74126/1981. Firing of polytitanocarbosilane, however, results in a Si-Ti-O-C ceramic system which suggests the presence of much oxygen in the ceramic. These oxygen rich ceramic materials undesirably experience an acute loss of strength at temperatures higher than 1,300° C. due to promoted crystallization.

In turn, U.S. Pat. No. 4,312,970 or Japanese Patent Application Kokai No. 139124/1982 discloses Si-C-N and Si-C-N-O ceramic systems. The present inventors examined the strength and crystallization of these ceramic materials to find that crystallization proceeded at temperatures higher than 1,300° C. resulting in a sudden loss of strength.

Further, the prior art known ceramic precursor methods have forming and working problems and suffer from low production yields.

The present invention is to eliminate the above-mentioned drawbacks of the prior art, and its object is to provide a method for preparing a ceramic precursor having forming and working flexibility and ensuring high ceramic production yields as well as a method for preparing a ceramic material having practical heat resistance at temperatures of higher than 1,300° C. using the ceramic precursor.

SUMMARY OF THE INVENTION

In search for ceramic materials having higher heat resistance and strength than conventional ceramic materials obtained by the prior art ceramic precursor methods, the inventors have discovered novel polytitanocarbosilazane polymers containing Ti therein, which are distinguishable from conventional well-known silazane polymers. We have also discovered that ceramic materials of Si-Ti-C-N and Si-Ti-C-N-O systems resulting from such polymers have unexpectedly high heat resistance.

More particularly, in order to develop a ceramic production method belonging to the precursor methods and a method for preparing a ceramic precursor for use in the ceramic production method featuring productivity and workability, we paid attention to $SiC-Si_3N_4$ system ceramic materials having high-temperature properties common to SiC and $Si_3N_4$ and proposed organic silazane polymers and preparation of ceramic materials from the polymers as disclosed in U.S. Pat. Nos. 4,847,345 and 4,869,854 or Japanese Patent Application Kokai Nos. 193930/1988 and 210133/1988. Continuing research for further improving heat resistance and oxidation resistance over these polymers, we have found that by reacting the following reactants, (A) an organic silicon compound of the general formula:

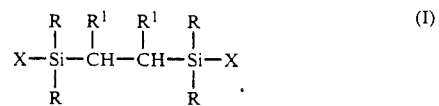

wherein R is selected from the group consisting of hydrogen, chloro, bromo, methyl, ethyl, phenyl and vinyl radicals, $R^1$ is hydrogen or a methyl radical, and X is chloro or bromo, (B) an organic silicon compound of the general formula:

wherein $R^2$ and $R^3$ are independently selected from the group consisting of hydrogen, chloro, bromo, methyl, ethyl, phenyl and vinyl radicals, and X is chloro or bromo, (C) a titanium compound, and (D) a disilazane of the general formula:

wherein $R^4$, $R^5$ and $R^6$ are independently selected from the group consisting of hydrogen, methyl, ethyl, phenyl and vinyl radicals, typically in an anhydrous atmosphere at a temperature of 25° to 350° C., and distilling off volatile components by-produced, there is obtained a novel polytitanocarbosilazane polymer having Ti incorporated therein. This polytitanocarbosilazane polymer can be spun by means of a spinning machine into a filament which in green state has unexpectedly high tensile strength and flexibility so that it is easily handled without breakage. That is, the polytitanocarbosilazane polymer provides ease of spinning, good formability, and good workability. When the polytitanocarbosilazane polymer is converted into inorganic form by melting, forming, infusibilizing, and pyrolysis, there is produced a ceramic material of Si-Ti-C-N or Si-Ti-C-N-O system in acceptable yields which has high strength and modulus of elasticity, maintains such properties at temperatures as high as about 1,400° C., and exhibits unexpectedly high heat resistance and oxidation resistance.

Briefly stated, the present invention provides a method for preparing a polytitanocarbosilazane polymer comprising the step of reacting (A) an organic silicon compound of formula (I), (B) an organic silicon compound of formula (II), (C) a titanium compound, and (D) a disilazane of formula (III).

The present invention also provides a method for preparing a ceramic comprising the steps of melting, forming, infusibilizing, and pyrolyzing a polytitanocarbosilazane polymer prepared by the above-defined method.

DETAILED DESCRIPTION OF THE INVENTION

Figure 1:
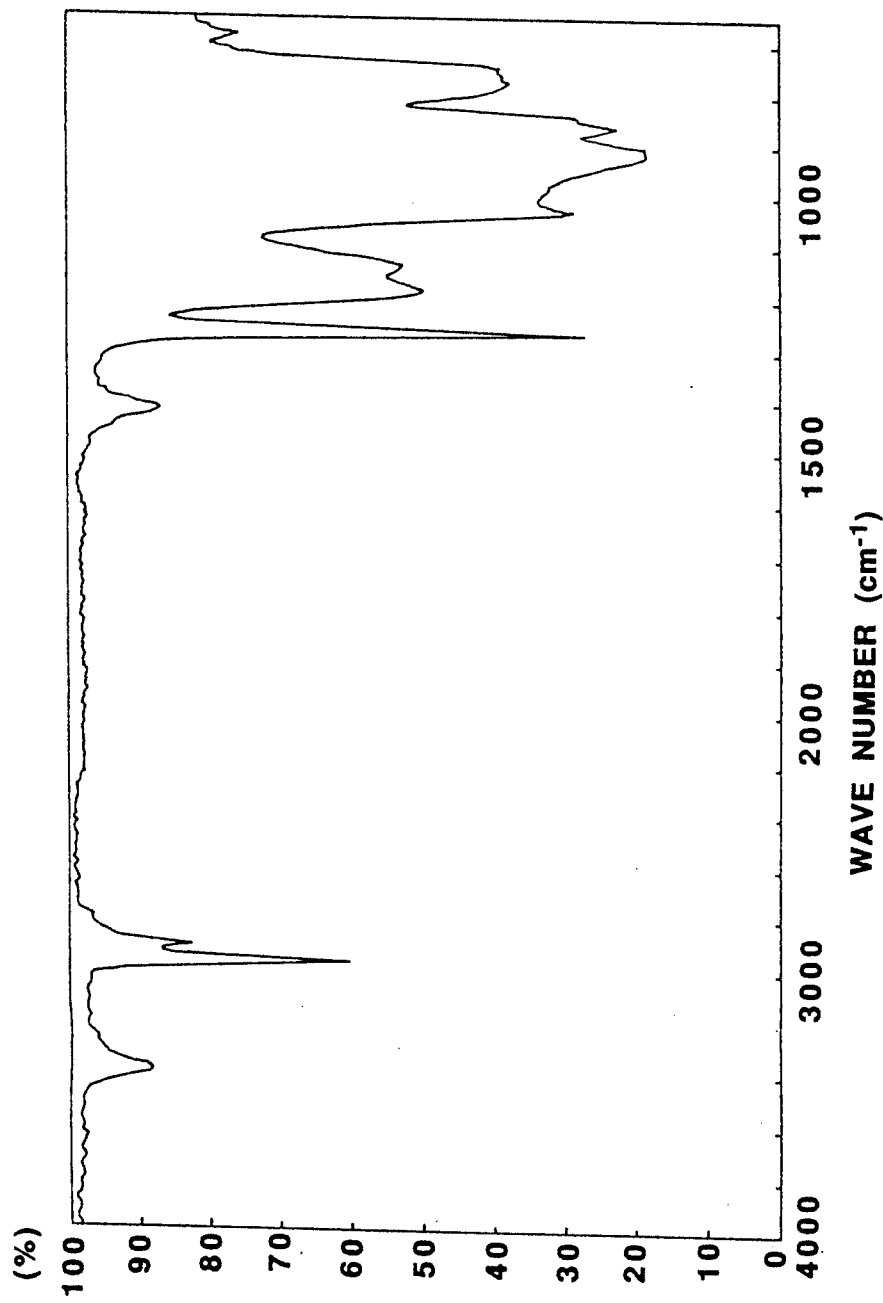
FIG. 1 is an IR spectrum chart of a polytitanocarbosilazane resulting from the polymerization step of Example 1.

According to the present invention, a polytitanocarbosilazane polymer is prepared by reacting (A) an organic silicon compound of formula (I), (B) an organic silicon compound of formula (II), (C) a titanium compound, and (D) a disilazane of formula (III). Preferably, a mixture of an organic silicon compound of formula (I), an organic silicon compound of formula (II), and a titanium compound is used as a starting material.

Examples of the organic silicon compound of formula (I) include
$ClH_2SiCH_2CH_2SiH_2Cl$
$Cl_2HSiCH_2CH_2SiHCl_2$
$Cl_3SiCH_2CH_2SiCl_3$
$Cl(CH_3)_2SiCH_2CH_2Si(CH_3)_2Cl$
$Cl_2(CH_3)SiCH_2CH_2Si(CH_3)CL_2$
$Cl(CH_3)_2SiCH(CH_3)CH(CH_3)Si(CH_3)_2Cl$
$Cl_2(CH_2=CH)SiCH_2CH_2Si(CH=CH_2)Cl_2$, etc.
Among these, preferred are 1,2-bis(chlorodimethylsilyl)-ethane, 1,2-bis(dichloromethylsilyl)ethane, and 1,2-bis(trichlorosilyl)ethane.

Examples of the organic silicon compound of formula (II) include $H_2SiCl_2$, $HSiCl_3$, $SiCl_4$, $CH_3SiCl_3$, $(CH_3)_2SiCl_2$, $(C_2H_5)SiCl_3$, $(C_2H_5)_2SiCl_2$, $C_6H_5SiCl_3$, $(C_6H_5)_2SiCl_2$, $CH_2=CHSiCl_3$, $(CH_2=CH)_2SiCl_2$, $(CH_2=CH)(CH_3)SiCl_2$, etc.

Examples of the titanium compound include titanium halides such as $TiCl_4$ and $TiBr_4$.

In the practice of the invention, the compounds of formulae (I) and (II) are mixed such that the ratio of (I) to (II) is 10-40 mol % to 90-60 mol %. If the compound of formula (I) is less than 10 mol %, there would be formed a less strong or flexible silazane polymer which is thereafter melted and spun into a filament which often breaks during winding or subsequent handling steps, resulting in final articles being obtained in low yields for the overall procedure from the initial to final step and sometimes showing poor strength properties. If the compound of formula (I) is more than 40 mol %, the resulting polytitanocarbosilazane is converted into a ceramic material having an increased content of free carbon and less oxidation resistance.

As previously described, a mixture of an organic silicon compound of formula (I), an organic silicon compound of formula (II), and a titanium compound (to be referred to as mixture M, hereinafter) is preferably used as a starting material. Mixture M preferably contains the titanium compound in an amount of 1 to 10 mol %, more preferably 2 to 5 mol % based on the total of organic silicon compounds of formulae (I) and (II). With the titanium compound in excess of 10 mol %, there would be formed an insoluble titanium compound so that substantially no titanium can be introduced into the polymer while unreacted halogen (e.g., chlorine) can be left in the polymer. The resulting polymer is less thermally stable. Less than 1 mol % of the titanium compound is ineffective to render the resulting ceramic to be fully resistant against heat.

In the practice of the invention, the disilazane of formula (III) is added to mixture M for reaction, preferably in at least an equimolar amount to mixture M, more preferably in a molar amount of 1.0 to 1.1 times the mol of mixture M. Examples of the disilazane of formula (III) include $(H_3Si)_2NH$, $[H_2(CH_3)Si]_2NH$, $[H(CH_3)_2Si]_2NH$, $[(CH_3)_3Si]_2NH$, $[(C_2H_5)_3Si]_2NH$, $[(C_6H_5)_3Si]_2NH$, $[CH_2=CH(CH_3)_2Si]_2NH$, $[CH_2=CH(C_6H_5)_2Si]_2NH$, $[CH_2=CH(C_2H_5)_2Si]_2NH$, etc., and mixtures thereof.

Reaction of the disilazane of formula (III) with mixture M is preferably effected in a solventless system although they may be dissolved in a suitable solvent such as toluene and xylene. The reaction favors an anhydrous atmosphere and a temperature of 25° to 350° C., especially 150° to 300° C. Reaction does not proceed at temperatures lower than 25° C. whereas it is too much accelerated at temperatures higher than 350° C. Preferred reaction conditions under which ceramic fiber-forming precursors are produced include a temperature of 150° to 300° C. and a time of ½ to 5 hours, especially 1 to 3 hours. During or after reaction, volatile by-products are distilled out of the reaction system, leaving the polytitanocarbosilazane polymer in different forms varying from oil to solid forms.

Although not bound to the theory, it is believed that reactions of the following schemes A and B take place successively when the disilazane is added to mixture M.

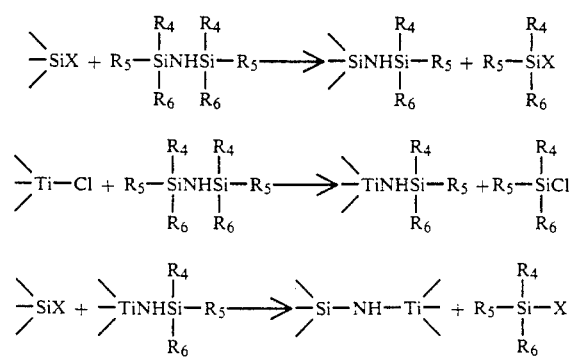

Reaction scheme A

-continued
Reaction scheme A

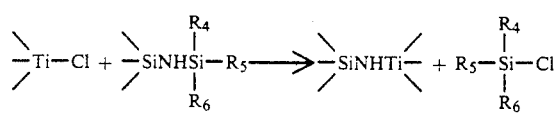

Reaction scheme B

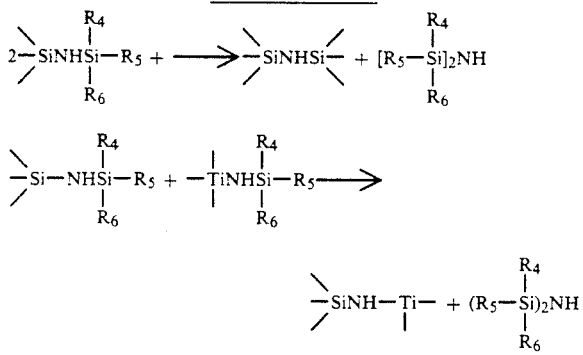

More particularly, reaction according to scheme A takes place first. As the temperature rises, condensation reaction according to scheme B initiates, producing the end polytitanocarbosilazane polymer having a high molecular weight. With the progress of reaction, low molecular weight compounds which are by-produced together with the polytitanocarbosilazane polymer can be taken out of the reaction system for reuse by distillation under atmospheric or reduced pressure.

The degree of polymerization and melting point of the polytitanocarbosilazane polymer can be controlled by changing the mixing ratio of organic silicon compounds, reaction temperature and time, and other parameters. Molecular weight and melting point can also be controlled by stripping off relatively low molecular weight oligomers in a reduced pressure while the reaction mixture is hot.

The thus obtained polytitanocarbosilazane polymer as a ceramic precursor can be formed into any desired shape, especially a fiber or sheet shape by taking advantage of improved formability and workability. The polymer can also be utilized as a binder or adhesive.

The method for preparing a ceramic according to the invention involves the steps of melting, forming, infusibilizing, and pyrolyzing a polytitanocarbosilazane polymer prepared as above. Those polymers having a melting point of 60° to 250° C. and a molecular weight of 800 to 5,000 as measured by benzene cryoscopy are preferred.

In the ceramic preparation, the polytitanocarbosilazane polymer resulting from the above-mentioned reaction may be melted and formed directly although it is preferred to remove insolubles prior to forming by dissolving the silazane polymer in an organic solvent such as hexane, benzene, toluene, and tetrahydrofuran followed by filtration and vacuum distillation of the solvent or by filtering the melt while hot. Such a work-up step to remove insolubles ensures formation of a foreign matter-free article of consistent quality having high strength.

The steps of melting, forming, infusibilizing, and pyrolyzing polytitanocarbosilazane polymers are not particularly limited. The silazane polymers are melted, formed into articles of desired shape, rendered infusible, and finally fired or pyrolyzed to produce ceramic articles of the desired shape.

When it is desired to produce ceramic fibers, the polytitanocarbosilazane polymer is first melted by heating to above the melting point of the polymer and then spun into a filament by melt spinning methods. Although the spinning temperature depends on the melting point of the polymer, it is preferred to spin the polymer at a temperature of from 100° to 300° C.

The formed article may be rendered infusible by heating in air, preferably to a temperature of 50° to 250° C. Temperatures of lower than 50° C. are insufficient for infusibilizing purposes whereas heating temperatures of higher than 250° C. cause the polymer to melt again or introduce more oxygen in the resulting ceramic with a loss of strength.

Another preferred infusibilizing method is our method as disclosed in Ser. No. 07/371,716 filed June 27, 1989 now U.S. Pat. No. 5,008,348 corresponding to Japanese Patent Application Kokai Nos. 14220/1990 and 34565/1990, which U.S. patent is incorporated herein by reference. This infusibilizing method involves treating a silazane polymer with a gas containing at least one silicon compound of the formula:

wherein R' is a hydrogen atom, a lower alkyl radical, an alkenyl radical, or an aryl radical, Z is a chlorine, bromine or iodine atom, and letter a has a value of from 0 to 2, R radicals may be the same or different when a is equal to 2, in vapor form, and then treating with humid air or an ammonia-containing gas.

More particularly, a green filament resulting from melt spinning is subjected to a first infusibilizing step using a gas containing at least one silicon compound of formula (IV) in vapor form as an infusibilizing agent and then to a second infusibilizing step using humid air or an ammonia-containing gas.

Examples of the infusibilizing agent of formula (IV) include $CH_3SiCl_3$, $(CH_3)_2SiCl_2$, $(C_2H_5)SiHCl_2$, $(C_2H_5)_2SiCl_2$, $C_6H_5SiCl_3$, $(C_6H_5)_2SiCl_2$, $CH_2=CHSiCl_3$, $(CH_2=CH)_2SiCl_2$, $HSiCl_3$, $H_2SiCl_2$, $SiCl_4$, $H(CH_3)SiCl_2$, $H(CH_2=CH)SiCl_2$, and $(CH_2=CH)C_6H_5SiCl_2$, and mixtures of two or more. Most preferred are $HSiCl_3$ and $SiCl_4$.

The fibers may be treated with a gas containing the infusibilizing agent in any desired manner. For example, an inert gas such as nitrogen ($N_2$), argon (Ar), and helium (He) may be used as a carrier gas. The carrier gas is passed into the infusibilizing agent and then to a region where the fibers are placed whereupon the fibers are contacted with the carrier gas having the vapor of the agent carried thereon. The concentration of the infusibilizing agent in the gas may be controlled to a desired level by adjusting the temperature of the infusibilizing agent source so as to give an appropriate vapor pressure. If the concentration of the agent in the gas is too high, the gas may be diluted with an inert gas. In general, the concentration of infusibilizing agent vapor is preferably controlled to 0.001 to 0.1 mol of the agent per liter of the carrier gas. The treating temperature and time vary with a particular type of polytitanocarbosilazane polymer used. Usually, the treating temperature is a sufficiently low temperature to maintain the polymer infusible, that is, a temperature sufficiently lower than the melting point of the polymer. The treating time is a sufficient time to render the fibers substantially infusible, typically about 5 to about 240 minutes. At the end of the first infusibilizing step, the polymer fibers become insoluble in commonly used solvents, for example, benzene, hexane, toluene, and tetrahydrofuran. However, the polymer fibers resulting from only the first infusibilizing step are not fully infusible and will melt during subsequent pyrolysis.

The second step of treating with a water vapor-containing gas or ammonia-containing gas is essential to enhance the infusibility of polymer fibers. The manner of treatment in the second step is not particularly limited. In the case of treatment with a water vapor-containing gas, for example, the fibers resulting from the first infusibilizing step may be simply exposed in air for a predetermined time to render the fibers completely infusible. The air exposure is simple, but somewhat difficult to consistently yield ceramic fibers having high strength and modulus because the humidity in air is not always constant. Due to varying humidity, subsequent pyrolysis will result in fibers having a varying oxygen content or fused fibers. Therefore, the second step is preferably carried out by passing air or an inert gas such as nitrogen and argon into water at a controlled temperature, more preferably bubbling air or inert gas through water at a predetermined rate, thereby forming air or inert gas containing saturated water vapor at the temperature. The resulting gas with saturated water vapor is passed over the fibers for a sufficient time to complete infusibilization. The temperature of water into which air or inert gas is bubbled at the predetermined rate preferably varies over the range of 0° to 100° C., more preferably 0° to 70° C., most preferably 0° to 30° C.

In the case of ammonia gas treatment, infusibilization may be completed by exposing the fibers resulting from the first infusibilizing step to ammonia gas or ammonia gas diluted with an inert gas. In the second step, the ammonia gas concentration preferably ranges from 0.01 to 100% by volume, more preferably from 0.2 to 50% by volume, most preferably from 0.5 to 10% by volume. If the ammonia concentration is too high, the ammonia gas is diluted with a rare gas such as argon and helium or an inert gas such as nitrogen gas. The ammonia gas with or without a diluent gas may be passed over the fibers for a sufficient time to complete infusibilization.

The treating temperature and time in the second step will vary with a particular type of polytitanocarbosilazane polymer used as in the first step. Usually, the treating temperature is a temperature sufficiently lower than the melting point of the polymer. The treating time is a sufficient time to complete infusibilization, typically about 5 to about 240 minutes.

The formed polymer articles thus made infusible at their surface are then fired for pyrolysis in a conventional manner, yielding ceramic articles. For example, surfaceinfusible fibers are sintered at high temperatures under tension or in free state, resulting in ceramic fibers of Si-Ti-C-N system and having high strength, modulus of elasticity, heat resistance and oxidation resistance. Sintering is preferably carried out in vacuum or in an inert gas such as argon or in an atmosphere of nitrogen ($N_2$), hydrogen ($H_2$) or ammonia ($NH_3$) gas at a temperature of about 700° to about 2,000° C., more preferably about 700° to about 1,500° C. Most preferably, the surface-infusible fibers are sintered under tension because there are produced ceramic fibers of quality as typified by a tensile strength of 200 to 300 kg/mm$^2$ and a modulus of elasticity of 14 to 25 t/mm$^2$.

Alternatively, the polytitanocarbosilazane polymer may be added as a binder to a ceramic-forming powder of at least one member selected from alumina, silicon carbide, silicon nitride, and boron nitride. The mixture is then molded and fired into a ceramic article of quality. Preferably, 2 to 10 parts, preferably 3 to 5 parts by weight of the polytitanocarbosilazane polymer is added to 100 parts by weight of the ceramic-forming powder.

There has been described a method for preparing a polytitanocarbosilazane polymer which is easily formable and workable, has high strength and flexibility, and is thus suitable as a ceramic fiber-forming precursor, ensuring high ceramic production yields. The ceramic preparing method according to the present invention permits easy formation of the silazane polymer into a desired shape including fiber and sheet shapes and sintering thereof into a Si-Ti-C-N or Si-Ti-C-N-O ceramic material of quality having high strength, modulus of elasticity, heat resistance, and oxidation resistance in high yields.

EXAMPLE

Examples of the present invention are given together with Comparative Examples by way of illustration and not by way of limitation. In the examples, all molecular weights are in grams per mole.

EXAMPLE 1

Polymerization

A dry 500-ml, four-necked flask equipped with a stirrer, thermometer, gas inlet tube, dropping funnel, and distillation unit was charged with 12.8 grams (0.05 mol) of 1,2-bis(methyldichlorosilyl)ethane, 62.3 grams (0.45 mol) of methyltrichlorosilane, and 4.7 grams (0.025 mol) of TiCl$_4$. Then, 291 grams (1.81 mol) of [(CH$_3$)$_3$Si]$_2$NH was added dropwise to the flask through the dropping funnel. The reaction solution turned yellow. The mixture was gradually heated in a nitrogen atmosphere (when the reactor temperature reached 70° C., reflux began with a vapor temperature of 59° C.) until a reaction temperature of 300° C. was reached while distilling off volatile components (trimethylchlorosilane and hexamethyldisilazane) as produced by reaction. The reaction mixture was kept at the temperature for two hours and then cooled down to room temperature. The reaction mixture was worked up by adding 150 ml of dry hexane to the reaction mixture to form a solution and removing the insolubles by filtration, and then stripped of the hexane and low molecular weight substances at 250° C. and 10 mmHg. The residue was 39 grams of a polymer in the form of a glassy yellow solid. It had a molecular weight of 2560 as measured by benzene molar depression of freezing point (common in the following examples) and a melting point of 170° C. and contained 100 ppm of residual chlorine as measured by a potentiometric titration method. An IR spectrum chart is shown in FIG. 1, which reveals absorption peaks at 3400 cm$^{-1}$ for NH, 2980 cm$^{-1}$ for CH and 1250 cm$^{-1}$ for SiCH$_3$.

Fiber formation

The silazane polymer obtained in the foregoing polymerization step, 10 grams, was melted at 220° C. and spun into a filament by means of a mono-hole spinning machine with an orifice of 0.5 mm in diameter. Spinning was smooth at a take-up speed of 250 m/min. The green filament was unexpectedly strong as demonstrated by a tensile strength of 7 kg/mm$^2$.

Figure 2:
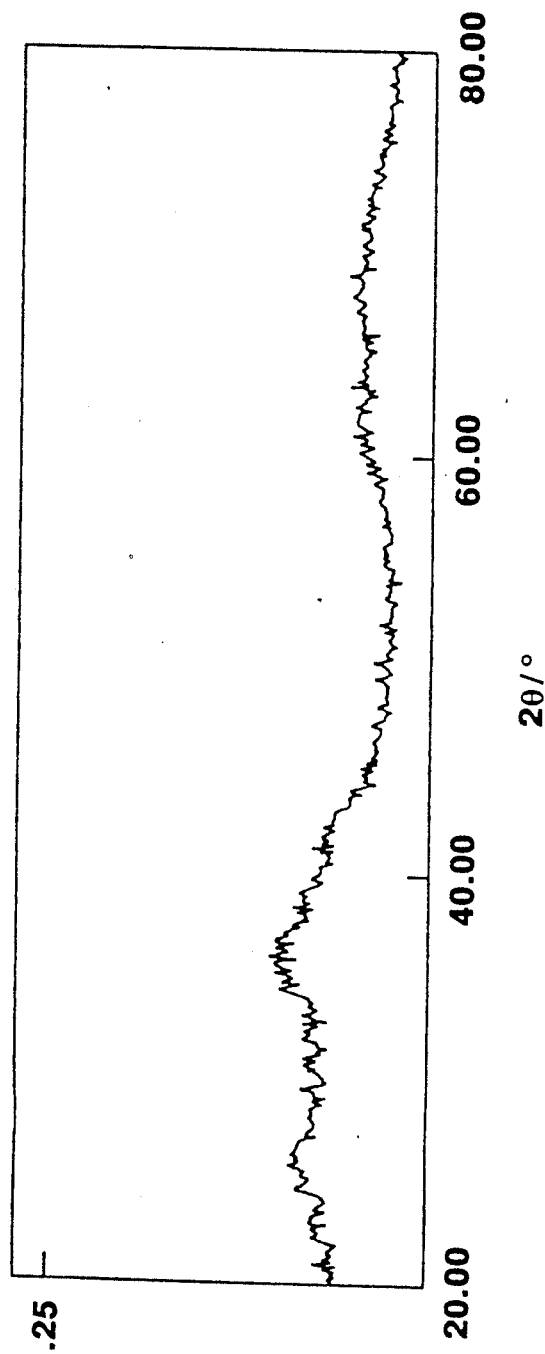
FIG. 2 is an X-ray diffraction chart of ceramic fiber resulting from the fiber forming step of Example 1.

The green filament was rendered infusible by heating it from 100° C. to 220° C. in air at a rate of 10° C./hour. The filament under light tension was then heated to 1,350° C. at a rate of 200° C./hour in a nitrogen stream and sintered at the temperature for 30 minutes. The ceramic fiber yield was 70%. The fiber had a diameter of 12 μm, a tensile strength of 200 kg/mm$^2$, and a modulus of elasticity of 14 t/mm$^2$. Elemental analysis showed that the fiber was of a Si-Ti-C-N-O system consisting of 53.9% Si, 19.0% C, 15.0% N, 9.5% O, and 2.6% Ti. An X-ray diffraction chart is shown in FIG. 2 which reveals that the fiber is of amorphous ceramic.

EXAMPLE 2

Polymerization

As in the polymerization step of Example 1, a 500-ml, four-necked flask was charged with 25.6 grams (0.1 mol) of 1,2-bis(methyldichlorosily)ethane, 59.8 grams (0.4 mol) of methyltrichlorosilane, and 3.8 grams (0.02 mol) of TiCl$_4$, 270.5 grams (1.68 mol) of [(CH$_3$)$_3$Si]$_2$NH was added dropwise through a dropping funnel, and reaction was continued for three hours at a temperature of 300° C. The reaction mixture was cooled down and similarly worked up, obtaining 50 grams of a blackish yellow solid. The polymer had a molecular weight of 2620 and a melting point of 175° C.

Fiber formation

The silazane polymer obtained in the foregoing polymerization step, 10 grams, was melted at 230° C. and spun into a filament by means of the same spinning machine as in Example 1. The green filaments were suspended in a mullite column furnace of 50 mm in diameter and 1 m in length which was heated at a temperature of 40° C. The filaments were rendered infusible by treating with trichlorosilane gas (concentration 0.7% by volume) for one hour and then with ammonia gas (concentration 6% by volume) for 30 minutes. Thereafter, the column was purged with nitrogen and the filaments were heated at a rate of 240° C./hour in a nitrogen stream and fired at 1,300° C. for 30 minutes. There were obtained black lustrous fibers. The ceramic fiber yield was 63%. The fibers had a diameter of 10 μm, a tensile strength of 250 kg/mm$^2$, and a modulus of elasticity of 18 t/mm$^2$.

In another run, similar infusibilization was followed by firing at 1,400° C. for 30 minutes, resulting in a fiber having a diameter of 11 μm, a tensile strength of 248 kg/mm$^2$, and a modulus of elasticity of 19 t/mm$^2$, indicating no loss of physical properties. The results of X-ray diffraction analysis were the same as for 1300° C. firing, revealing that the fiber was amorphous. Elemental analysis showed that the fiber was of a Si-Ti-C-N system consisting of 61.5% Si, 19.7% C, 16.2% N, and 2.56% Ti.

EXAMPLE 3

Polymerization

As in the polymerization step of Example 1, reaction was effected for two hours at a temperature of 315° C. using 51.2 grams (0.2 mol) of 1,2-bis(methyldichlorosilyl)ethane, 44.9 grams (0.3 mol) of methyltrichlorosilane, 3.8 grams (0.02 mol) of TiCl$_4$, and 330 grams (1.86 mol) of [(CH$_3$)$_3$Si]$_2$NH. The reaction mixture was similarly worked up, obtaining 53 grams of a black solid. It had a molecular weight of 2418 and a melting point of 150° C.

Fiber formation

The silazane polymer obtained in the foregoing polymerization step, 10 grams, was melted at 200° C. and spun into a filament by means of the same spinning machine as in Example 1. The green filament was infusibilized by heating in air from 100° C. to 180° C. at a rate of 10° C./hour and then fired for 30 minutes at 1,350° C. in a nitrogen stream. The ceramic yield was 72%. The fiber had a diameter of 13 μm, a tensile strength of 225 kg/mm$^2$, and a modulus of elasticity of 16 t/mm$^2$. Elemental analysis showed that the fiber was of a Si-Ti-C-N-O system consisting of 54.0% Si, 20.5% C, 15.0% N, 2.0% Ti, and 8.5% O. X-ray diffraction analysis showed that the fiber was amorphous.

EXAMPLE 4

Polymerization

As in the polymerization step of Example 1, reaction was effected for one hour at a temperature of 300° C. using 25.6 grams (0.1 mol) of 1,2-bis(methyldichlorosilyl)ethane, 59.8 grams (0.4 mol) of methyltrichlorosilane, 7.6 grams (0.04 mol) of TiCl$_4$, and 312 grams (1.94 mol) of [(CH$_3$)$_3$Si]$_2$NH. The reaction mixture was similarly worked up, obtaining 48 grams of a black solid. It had a molecular weight of 2540 and a melting point of 139° C.

Fiber formation

The silazane polymer obtained in the foregoing polymerization step, 10 grams, was melted at 180° C. and spun into a filament by means of the same spinning machine as in Example 1. The green filament was infusibilized through two steps using trichlorosilane and ammonia gas as in Example 2 and then fired for 30 minutes at 1,400° C. in a nitrogen stream. The ceramic yield was 75%. The fiber had a diameter of 12 μm, a tensile strength of 231 kg/mm$^2$, and a modulus of elasticity of 17.8 t/mm$^2$. Elemental analysis showed that the fiber was of a Si-Ti-C-N system consisting of 60.2% Si, 19.5% C, 16.0% N, and 4.3% Ti. X-ray diffraction analysis showed that the fiber was amorphous.

EXAMPLE 5

Polymerization

As in the polymerization step of Example 1, reaction was effected for two hours at a temperature of 300° C. using 25.6 grams (0.1 mol) of 1,2-bis(methyldichlorosilyl)ethane, 59.8 grams (0.4 mol) of methyltrichlorosilane, 0.95 grams (5×10$^{-3}$ mol) of TiCl$_4$, and 287 grams (1.78 mol) of [(CH$_3$)$_3$Si]$_2$NH. The reaction mixture was similarly worked up, obtaining 42 grams of a brown solid. It had a molecular weight of 2420 and a melting point of 146° C.

Fiber formation

The silazane polymer obtained in the foregoing polymerization step, 10 grams, was melted at 200° C. and spun into a filament by means of the same spinning machine as in Example 1. The green filament was infusibilized through two steps using trichlorosilane and ammonia gas as in Example 2 and then fired for 30 minutes at 1,400° C. in a nitrogen stream. The ceramic yield was 68%. The fiber had a diameter of 11 μm, a tensile strength of 240 kg/mm$^2$, and a modulus of elasticity of 18 t/mm$^2$. Elemental analysis showed that the fiber was of a Si-Ti-C-N system consisting of 64.55% Si, 19.0% C, 15.8% N, and 0.65% Ti. X-ray diffraction analysis showed that the fiber was amorphous.

EXAMPLE 6

Polymerization

As in the polymerization step of Example 1, reaction was effected for one hour at a temperature of 280° C. using 59.4 grams (0.2 mol) of 1,2-bis(trichlorosilyl)ethane, 38.7 grams (0.3 mol) of dimethyldichlorosilane, 3.8 grams (0.02 mol) of TiCl$_4$, and 333 grams (2.07 mol) of [(CH$_3$)$_3$Si]$_2$NH. The reaction mixture was similarly worked up, obtaining 53 grams of a blackish brown solid. It had a molecular weight of 1900 and a melting point of 102° C.

Fiber formation

The silazane polymer obtained in the foregoing polymerization step, 15 grams, was melt spun into filaments as in Example 1. The green filaments were infusibilized with trichlorosilane and ammonia gas as in Example 2 and then fired at different temperatures of 1200°, 1300°, 1400°, 1500° and 1600° C. in a nitrogen stream. The physical properties of sintered fibers are reported in Table 1.

TABLE 1

| | Fiber diameter (μm) | Tensile strength (kg/mm$^2$) | Modulus of elasticity (t/mm$^2$) |
|---|---|---|---|
| Fired @ 1200° C., 30 min. | 12 | 220 | 18 |
| Fired @ 1300° C., 30 min. | 12 | 235 | 19 |
| Fired @ 1400° C., 30 min. | 12 | 220 | 18.5 |
| Fired @ 1500° C., 30 min. | 12 | 140 | 13 |
| Fired @ 1600° C., 30 min. | 12 | 50 | 12 |

As seen from Table 1, no substantial drop of strength was observed while the firing temperature was increased to 1400° C. X-ray diffraction analysis showed that the fibers remained amorphous at firing temperatures of up to 1400° C., but crystallized to a more or less extent at higher temperatures. Diffraction peaks attributable to SiN$_4$, SiC and TiN were definitely observed at a firing temperature of 1600° C.

COMPARATIVE EXAMPLE 1

Polymerization

A dry 500-ml, four-necked flask equipped with a stirrer, thermometer, gas inlet tube, dropping funnel, and distillation unit was charged with 74.8 grams (0.5 mol) of methyltrichlorosilane. Then, 241 grams (1.5 mol) of [(CH$_3$)$_3$Si]$_2$NH was added dropwise to the flask through the dropping funnel. The mixture was gradually heated in a nitrogen atmosphere. When the reactor temperature reached 67° C., reflux began with a vapor temperature of 59° C. The reaction temperature was slowly raised to 310° C. while distilling off trimethylchlorosilane and hexamethyldisilane as produced by reaction. The reaction mixture was kept at the temperature for 3½ hours and then cooled down to room temperature. The reaction mixture was worked up by adding 150 ml of dry hexane to the reaction mixture to form a solution and removing the insolubles by filtration, and then stripped of the hexane and low molecular weight substances at 250° C. and 10 mmHg. There was obtained 31 grams of a colorless solid. It had a molecular weight of 1926 and a melting point of 178° C. An IR spectrum showed absorption peaks at 3400 cm$^{-1}$ for NH, 2980 cm$^{-1}$ for CH and 1250 cm$^{-1}$ for SiCH$_3$.

Fiber formation

The polymer obtained in the foregoing polymerization step was melted at 230° C. and spun into a filament by means of the same mono-hole spinning machine as in Example 1. The filament snapped frequently during melt spinning and was very brittle as demonstrated by a tensile strength of 500 g/mm$^2$, which was one fourteenth of the strength of the green filament obtained in Example 1. The green filaments were infusibilized with trichlorosilane and ammonia gas as in Example 2 and then fired, under light tension, at different temperatures of 1200°, 1300°, 1350°, 1400°, and 1500° C. in a nitrogen stream. The physical properties of sintered fibers are reported in Table 2.

TABLE 2

| | Fiber diameter (μm) | Tensile strength (kg/mm$^2$) | Modulus of elasticity (t/mm$^2$) |
|---|---|---|---|
| Fired @ 1200° C., 30 min. | 12 | 170 | 14 |
| Fired @ 1300° C., 30 min. | 12 | 120 | 13 |
| Fired @ 1350° C., 30 min. | 12 | 100 | 12 |
| Fired @ 1400° C., 30 min. | 12 | 50 | 11 |
| Fired @ 1500° C., 30 min. | 12 | 20 | 11 |

As seen from Table 2, even the fiber fired at 1200° C. had considerably lower tensile strength and modulus of elasticity than those fibers reported in Table 1, and serious losses of physical properties were observed at firing temperatures of about 1300° C. or higher. X-ray diffraction analysis showed that the fibers remained amorphous at a firing temperature of 1200° C., but diffraction peaks appeared at a firing temperature of 1300° C. and a diffraction peak attributable to SiN$_4$ was definitely observed at 1400° C.

COMPARATIVE EXAMPLE 2

Polymerization

Reaction was effected for one hour at 300° C. by the same procedure as in Example 1 except that the flask was charged with 6.4 grams (0.025 mol) of 1,2-bis(methyldichlorosilyl)-ethane, 71.0 grams (0.474 mol) of methyltrichlorosilane, and 270 grams (1.68 mol) of [(CH$_3$)$_3$Si]$_2$NH while TiCl$_4$ was omitted. The reaction mixture was similarly worked up, obtaining 37 grams of a pale yellow solid. It had a molecular weight of 2370 and a melting point of 145° C.

Fiber formation

The polymer obtained in the foregoing polymerization step was melted at 200° C. and spun into a filament as in Example 1. The filament snapped sometimes during melt spinning. It was difficult to handle as demonstrated by a tensile strength of 1 kg/mm$^2$, which was one seventh of the strength of the green filament obtained in Example 1.

Several preferred embodiments have been described. Obviously many modifications and variations of the present invention are possible in the light of the above teachings. It is therefore to be understood that within the scope of the appended claims, the invention may be practiced otherwise than as specifically described.

We claim:

1. A method for preparing a polytitanocarbosilazane polymer comprising the step of reacting, under polymeriziation conditions, (A) an organic silicon compound of the general formula:

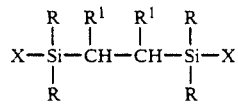

wherein R is selected from the group consisting of hydrogen, chloro, bromo, methyl, ethyl, phenyl and vinyl radicals, $R^1$ is hydrogen or a methyl radical, and X is chloro or bromo, (B) an organic silicon compound of the general formula:

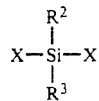

wherein $R^2$ and $R^3$ are independently selected from the group consisting of hydrogen, chloro, bromo, methyl, ethyl, phenyl and vinyl radicals, and X is chloro or bromo, (C) a titanium compound, and
(D) a disilazane of the general formula:

wherein $R^4$, $R^5$ and $R^6$ are independently selected from the group consisting of hydrogen, methyl, ethyl, phenyl and vinyl radicals.

2. The method of claim 1 wherein the compounds formulae (I) and (II) are mixed in a molar ratio (I)/(II) of from 10/90 to 40/60.

3. The method of claim 2 wherein the titanium compound is used in an amount of 1 to 10 mol % based on the total of the organic silicon compounds of formulae (I) and (II).

4. The method of claim 1 wherein the disilazane of formula (III) is used in at least equimolar amount to the total of components (A), (B), and (C).

5. The method of claim 1 wherein the titanium compound is used in an amount of 1 to 10 mol % based on the total of the organic silicon compounds of formulae (I) and (II).

* * * * *